(12) United States Patent
Kakuta (10) Patent No.: US 8,418,987 B2
(45) Date of Patent: Apr. 16, 2013

(54) DISPLAY APPARATUS

(75) Inventor: Yoshinori Kakuta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1302 days.

(21) Appl. No.: 12/003,445

(22) Filed: Dec. 26, 2007

(65) Prior Publication Data

US 2008/0237430 A1 Oct. 2, 2008

(30) Foreign Application Priority Data

Mar. 27, 2007 (JP) .................................. 2007-080732

(51) Int. Cl.
*H05K 5/00* (2006.01)

(52) U.S. Cl.
USPC ...... 248/917; 248/918; 361/752; 361/679.21; 361/679.24; 348/836

(58) Field of Classification Search ............... 248/163.1, 248/917, 918; 348/787, 789, 836; 361/679.01, 361/679.02, 679.21, 752, 825, 829, 379.22
See application file for complete search history.

(56) References Cited

U.S. PATENT DOCUMENTS

| | | | | |
|---|---|---|---|---|
| 3,386,012 A | * | 5/1968 | Seelig | 361/753 |
| 4,852,032 A | * | 7/1989 | Matsuda et al. | 361/679.27 |
| 5,772,293 A | * | 6/1998 | Hughes | 312/208.3 |
| 5,905,546 A | * | 5/1999 | Giulie et al. | 348/842 |
| 6,104,605 A | * | 8/2000 | Lee | 361/679.27 |
| 6,130,658 A | * | 10/2000 | Yamamoto et al. | 345/102 |
| 6,144,552 A | * | 11/2000 | Whitcher et al. | 361/679.3 |
| 6,330,150 B1 | * | 12/2001 | Kim | 345/87 |
| 6,560,124 B1 | * | 5/2003 | Irie et al. | 361/816 |
| D486,825 S | * | 2/2004 | Shiota et al. | D14/374 |
| 6,688,576 B2 | * | 2/2004 | Oishi et al. | 248/317 |
| 6,697,250 B2 | * | 2/2004 | Kuo | 361/679.6 |
| D496,361 S | * | 9/2004 | Hotta | D14/374 |
| 6,807,051 B2 | * | 10/2004 | Takahashi | 361/679.23 |
| 6,863,252 B2 | * | 3/2005 | Bosson | 248/278.1 |
| 6,975,368 B2 | | 12/2005 | Lee | |
| 7,002,640 B2 | * | 2/2006 | Jung | 348/787 |
| 7,213,692 B2 | * | 5/2007 | Wang et al. | 190/8 |
| D543,982 S | * | 6/2007 | Hasegawa et al. | D14/371 |
| 7,269,009 B2 | * | 9/2007 | Ryu et al. | 361/692 |
| 7,269,023 B2 | * | 9/2007 | Nagano | 361/752 |
| D580,934 S | * | 11/2008 | Hasegawa et al. | D14/371 |
| 7,450,372 B2 | * | 11/2008 | Lin et al. | 361/679.55 |
| 7,505,256 B2 | * | 3/2009 | Boudreau | 361/679.27 |

(Continued)

FOREIGN PATENT DOCUMENTS

| | | |
|---|---|---|
| CN | 1504801 A | 6/2004 |
| CN | 1707572 A | 12/2005 |

(Continued)

*Primary Examiner* — Terrell McKinnon
*Assistant Examiner* — Daniel J Breslin
(74) *Attorney, Agent, or Firm* — Birch, Stewart, Kolasch & Birch, LLP (57) ABSTRACT

A work to replace a display panel body is facilitated. A display apparatus includes a display panel unit (20) having a display panel body (22) that displays an image, and a panel supporting member (40) that is attached to the display panel unit (20) and that supports the display panel unit (20), wherein the display panel unit (20) has handles (36 to 39), and the handles (36 to 39) are at least partially exposed outside of the panel supporting member (40).

7 Claims, 11 Drawing Sheets

U.S. PATENT DOCUMENTS

| | | | |
|---|---|---|---|
| 7,508,655 B2 * | 3/2009 | Baek | 349/56 |
| 7,515,403 B2 * | 4/2009 | Hong | 361/679.22 |
| 7,529,082 B2 * | 5/2009 | Maruta | 312/7.2 |
| 7,542,286 B2 * | 6/2009 | Kang | 361/690 |
| 7,554,252 B2 * | 6/2009 | Kim | 313/46 |
| D595,715 S * | 7/2009 | Hasegawa et al. | D14/374 |
| 7,561,422 B2 * | 7/2009 | Meng et al. | 361/679.27 |
| 7,598,674 B2 * | 10/2009 | Jeong | 313/582 |
| 7,651,062 B2 * | 1/2010 | Matsutani et al. | 248/176.3 |
| 7,679,696 B2 * | 3/2010 | Makino | 349/58 |
| 7,684,175 B2 * | 3/2010 | Takao | 361/679.01 |
| 7,796,206 B2 * | 9/2010 | Hiradate et al. | 349/58 |
| 7,986,373 B2 * | 7/2011 | Maruta | 348/836 |
| 8,047,489 B2 * | 11/2011 | Watanabe | 248/292.14 |
| 2004/0090560 A1 * | 5/2004 | Jang | 348/836 |
| 2005/0236995 A1 * | 10/2005 | Bang et al. | 313/587 |
| 2005/0237438 A1 * | 10/2005 | Maruta | 348/797 |
| 2006/0061945 A1 * | 3/2006 | Kim | 361/681 |
| 2006/0077629 A1 * | 4/2006 | Shiraishi | 361/681 |
| 2006/0133017 A1 * | 6/2006 | Bang | 361/681 |
| 2006/0168865 A1 * | 8/2006 | Watanabe | 40/745 |
| 2006/0273231 A1 * | 12/2006 | Huang | 248/371 |
| 2006/0279189 A1 * | 12/2006 | Jeong | 313/46 |
| 2006/0290832 A1 * | 12/2006 | Lin et al. | 349/58 |
| 2006/0292723 A1 * | 12/2006 | Fukui | 438/29 |
| 2007/0046852 A1 * | 3/2007 | Kim et al. | 349/58 |
| 2007/0090734 A1 * | 4/2007 | Maruta | 312/223.2 |
| 2007/0091223 A1 * | 4/2007 | Maruta et al. | 349/58 |
| 2007/0097608 A1 * | 5/2007 | Matsutani et al. | 361/681 |
| 2007/0103605 A1 * | 5/2007 | Maruta | 348/797 |
| 2008/0074349 A1 * | 3/2008 | Hong | 345/55 |
| 2008/0253446 A1 | 10/2008 | Kosuge | |
| 2008/0298003 A1 * | 12/2008 | Pyo | 361/681 |
| 2009/0135577 A1 * | 5/2009 | Jeong | 361/816 |

FOREIGN PATENT DOCUMENTS

| | | |
|---|---|---|
| JP | 2003-223113 | 8/2003 |
| JP | 2005-70661 | 3/2005 |
| JP | 2005-309445 | 11/2005 |
| JP | 2006-030315 | 2/2006 |
| JP | 2006-301084 | 11/2006 |
| JP | 2006-308949 | 11/2006 |
| JP | 2007-24992 A | 2/2007 |
| JP | 2003-29643 A | 1/2008 |
| WO | WO 2006/092954 A1 | 9/2006 |

\* cited by examiner

DISPLAY APPARATUS

BACKGROUND OF THE INVENTION

1. Field of the Invention

The present invention relates to a flat-panel display apparatus such as a liquid-crystal display apparatus, a plasma display apparatus, etc., and to a relatively large-sized display apparatus having a so-called 40-inch or larger image display area, for example.

2. Description of the Background Art

Conventional image display apparatuses include that disclosed in Japanese Patent Application Laid-Open No. 2007-24992. With the image display apparatus disclosed therein, a plurality of electrical parts are mounted on the back side of a chassis, and a liquid-crystal panel is attached to the chassis, with the back plate of the liquid-crystal panel placed over the front side of the chassis. Also, a front cover is attached to the chassis, with the display surface of the liquid-crystal panel facing in the front opening from behind the front cover. A leg supported on a stand is fixed to connectors of stays that are attached to the chassis.

With this image display apparatus, the liquid-crystal panel is replaced as described below. First, the leg supported on the stand is detached. Next, the front cover is detached from the chassis, the liquid-crystal panel is detached from the chassis, and then another new liquid-crystal panel is attached to the chassis. The front cover is then attached to the chassis, and the leg supported on the stand is fixed.

With the image display apparatus constructed as above, the work of replacing the liquid-crystal panel involves difficulties because the liquid-crystal panel has a rather heavy weight itself.

SUMMARY OF THE INVENTION

An object of the present invention is to facilitate the work of replacing a display panel body.

In order to solve the problems described above, a display apparatus includes a display panel unit having a display panel body that displays an image, and a mount member that is attached to the display panel unit and supports the display panel unit. The display panel unit has a handle, and the handle is at least partially exposed outside of the mount member.

Thus, the display panel unit has a handle, and the handle is at least partially exposed outside of the mount member, so that a worker can attach and detach the display panel unit to and from the mount member while supporting the display panel unit by holding the handle, which facilitates the work of replacing the display panel body.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
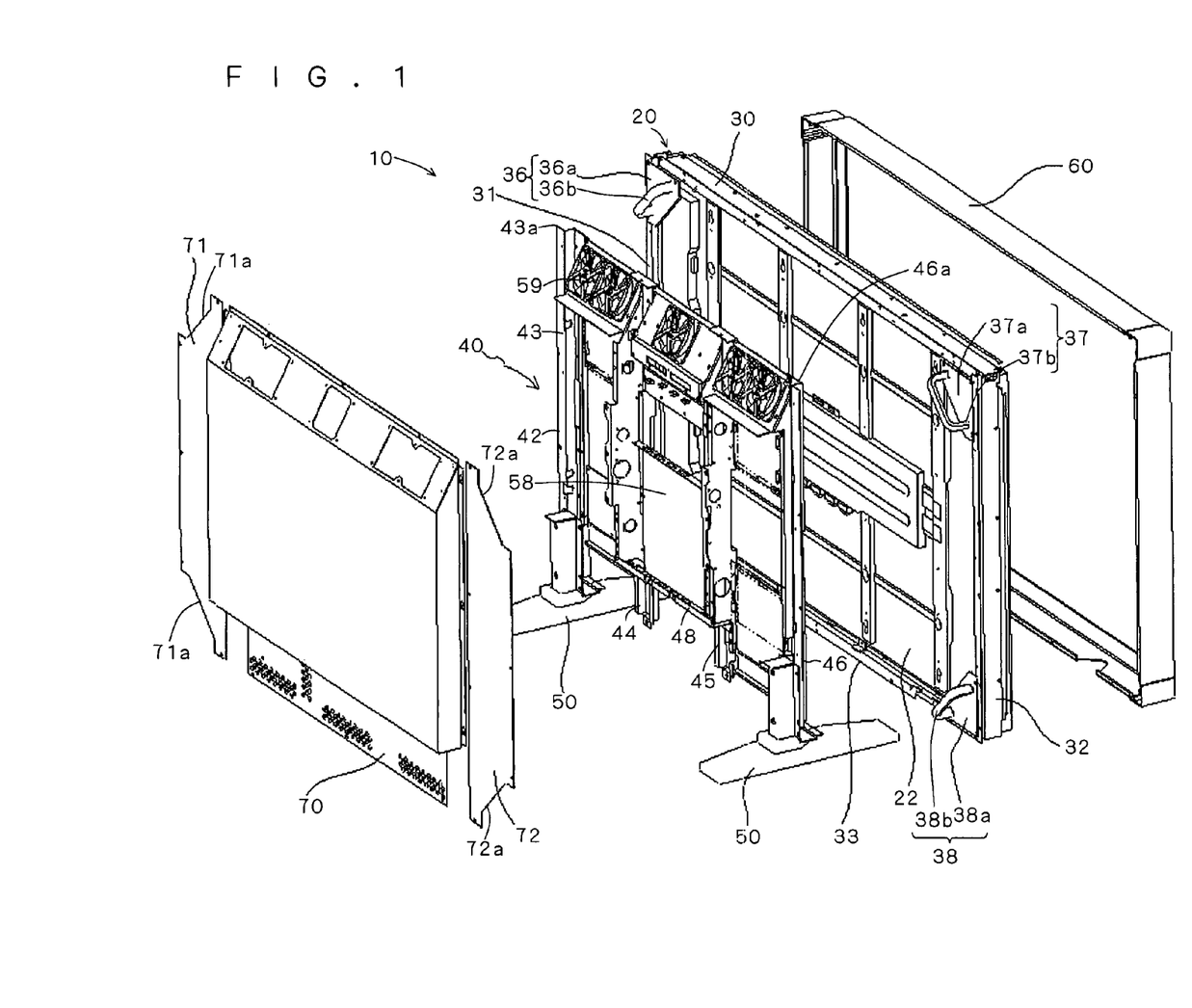
FIG. 1 is an exploded perspective view of a display apparatus according to a first preferred embodiment.
Figure 2:
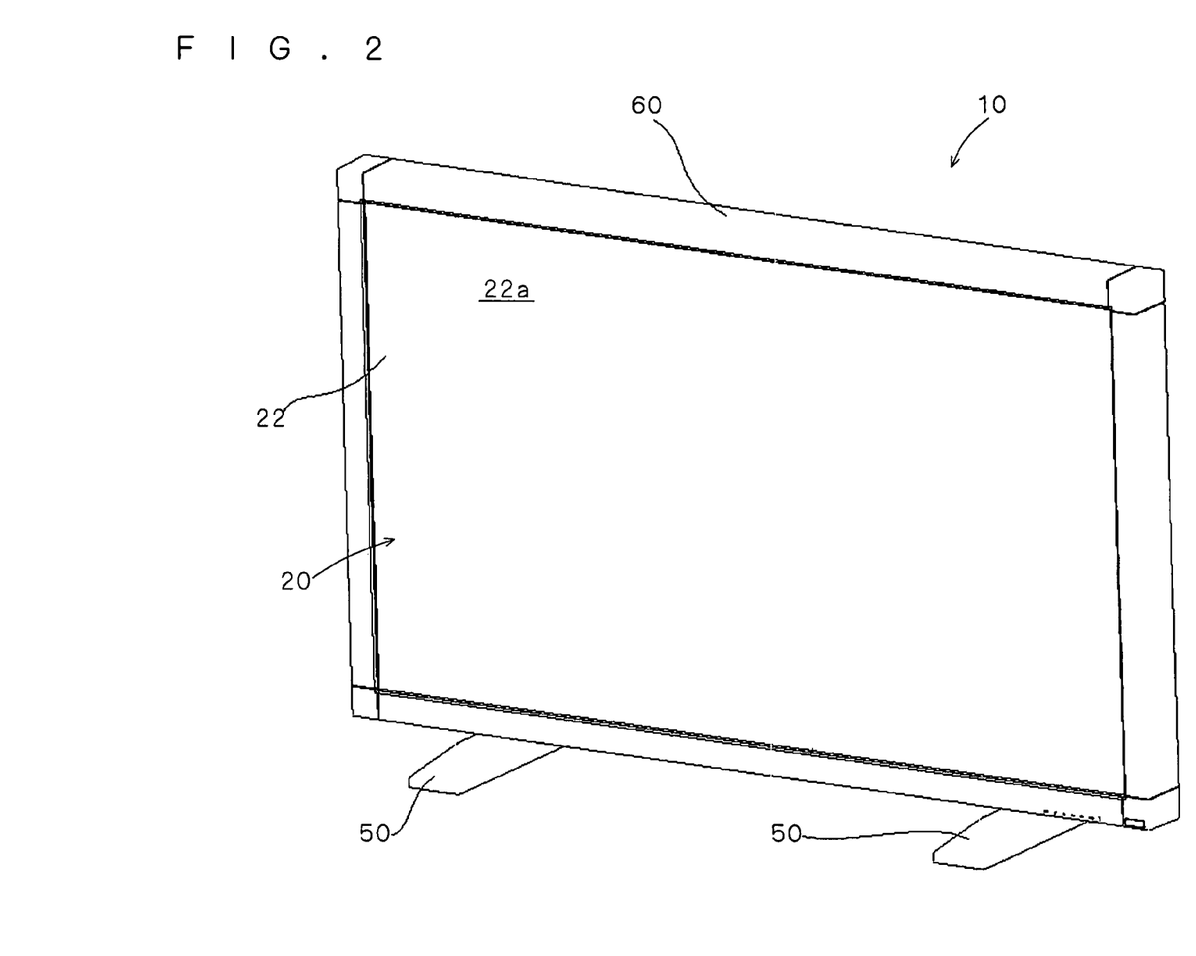
FIG. 2 is a perspective view of the display apparatus seen from front.
Figure 3:
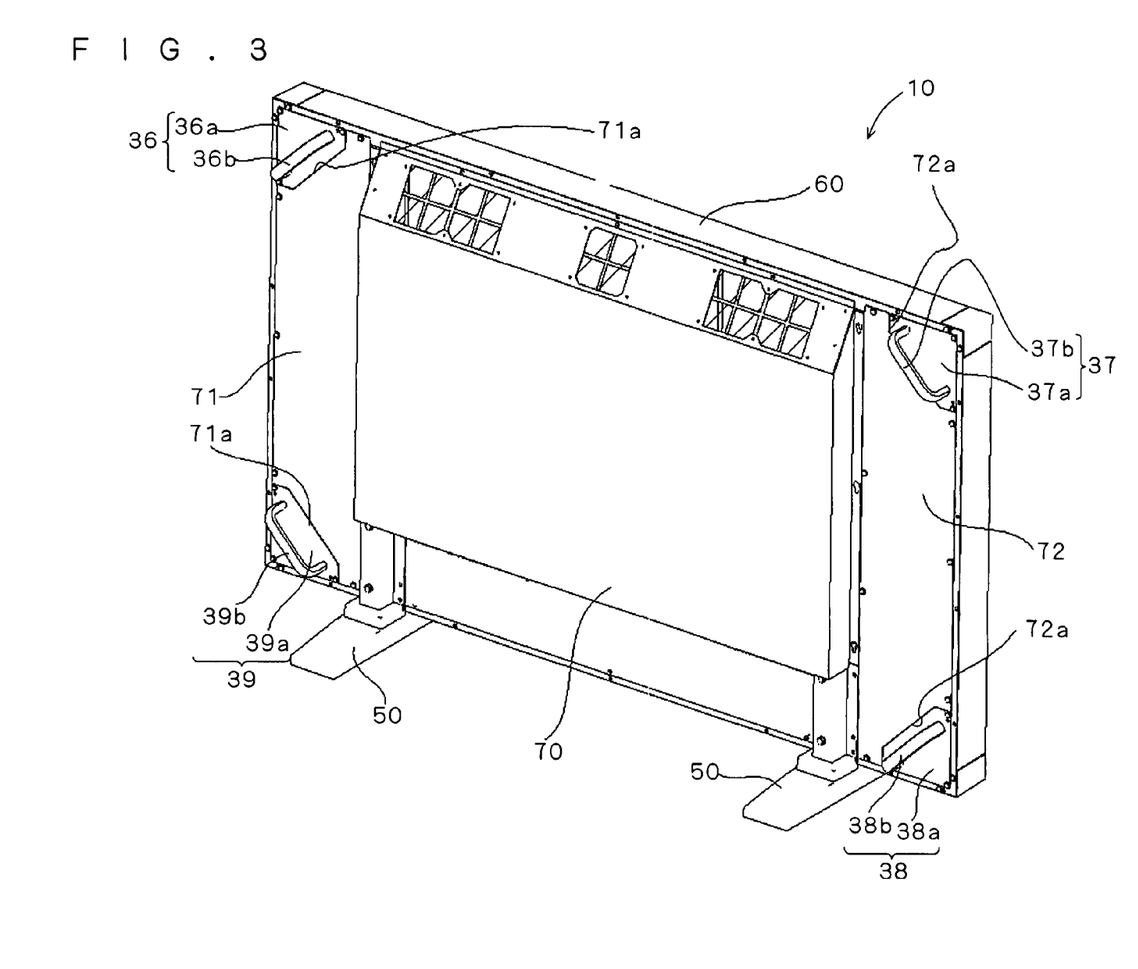
FIG. 3 is a perspective view of the display apparatus seen from behind.
Figure 4:
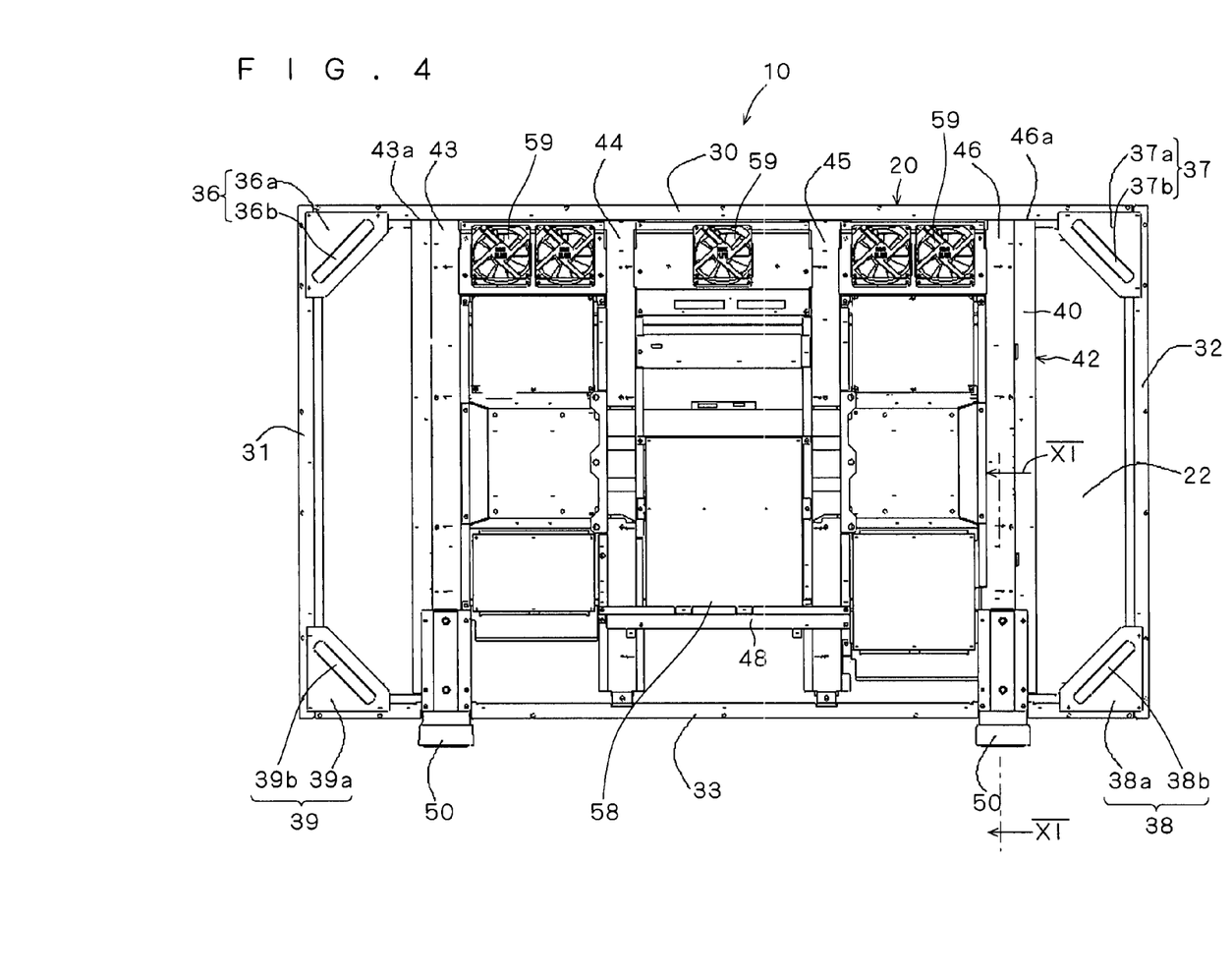
FIG. 4 is a perspective view of the display apparatus with its back panels removed from it.
Figure 5:
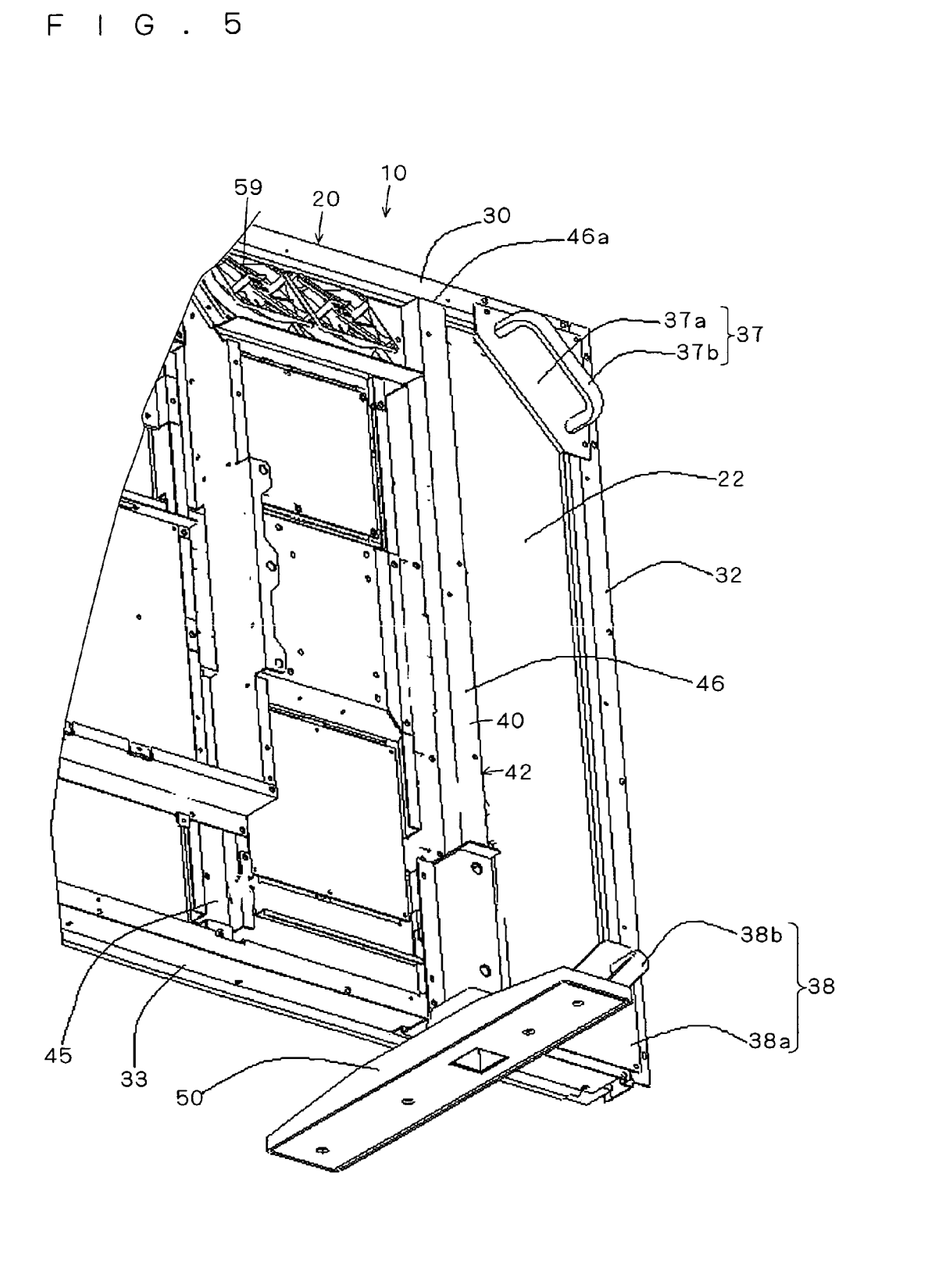
FIG. 5 is a partial perspective view illustrating the internal structure of the display apparatus seen from behind.
Figure 6:
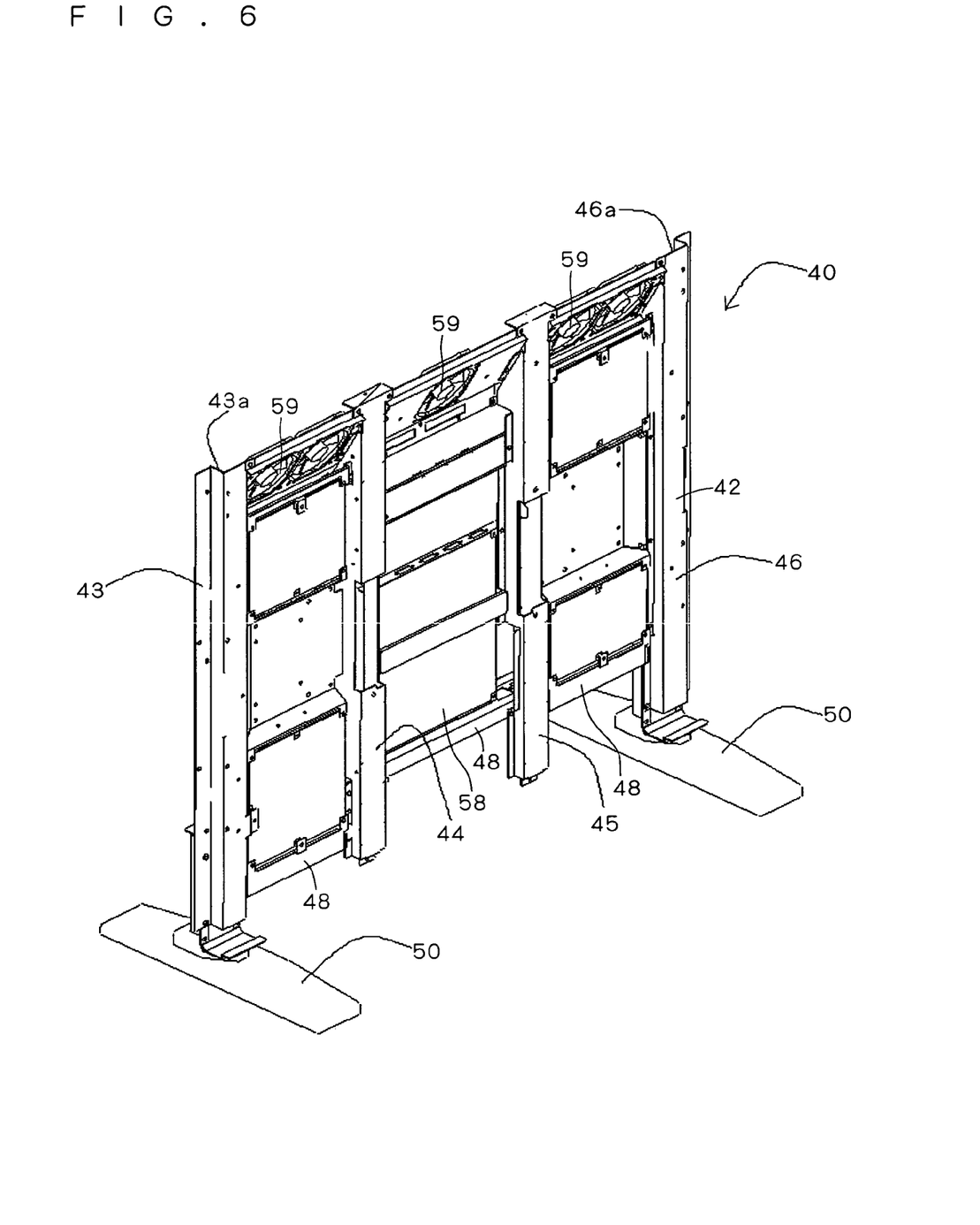
FIG. 6 is a perspective view of a panel supporting member of the display apparatus seen from front.
Figure 7:
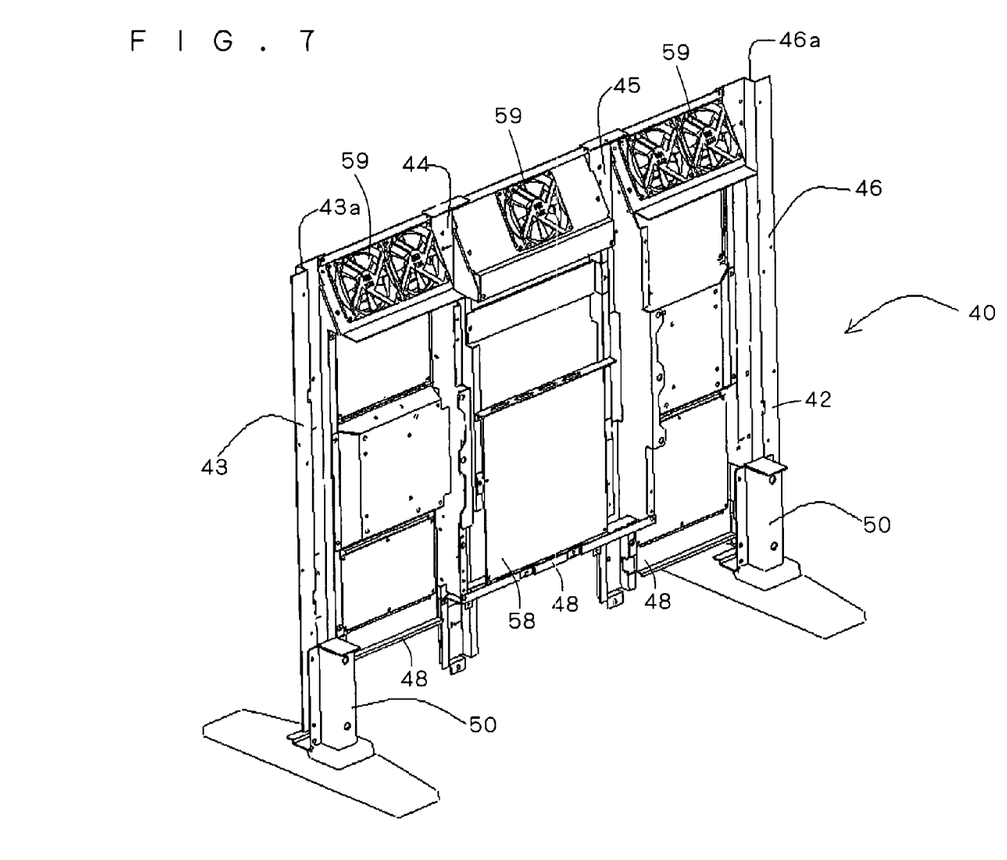
FIG. 7 is a perspective view of the panel supporting member seen from behind.
Figure 8:
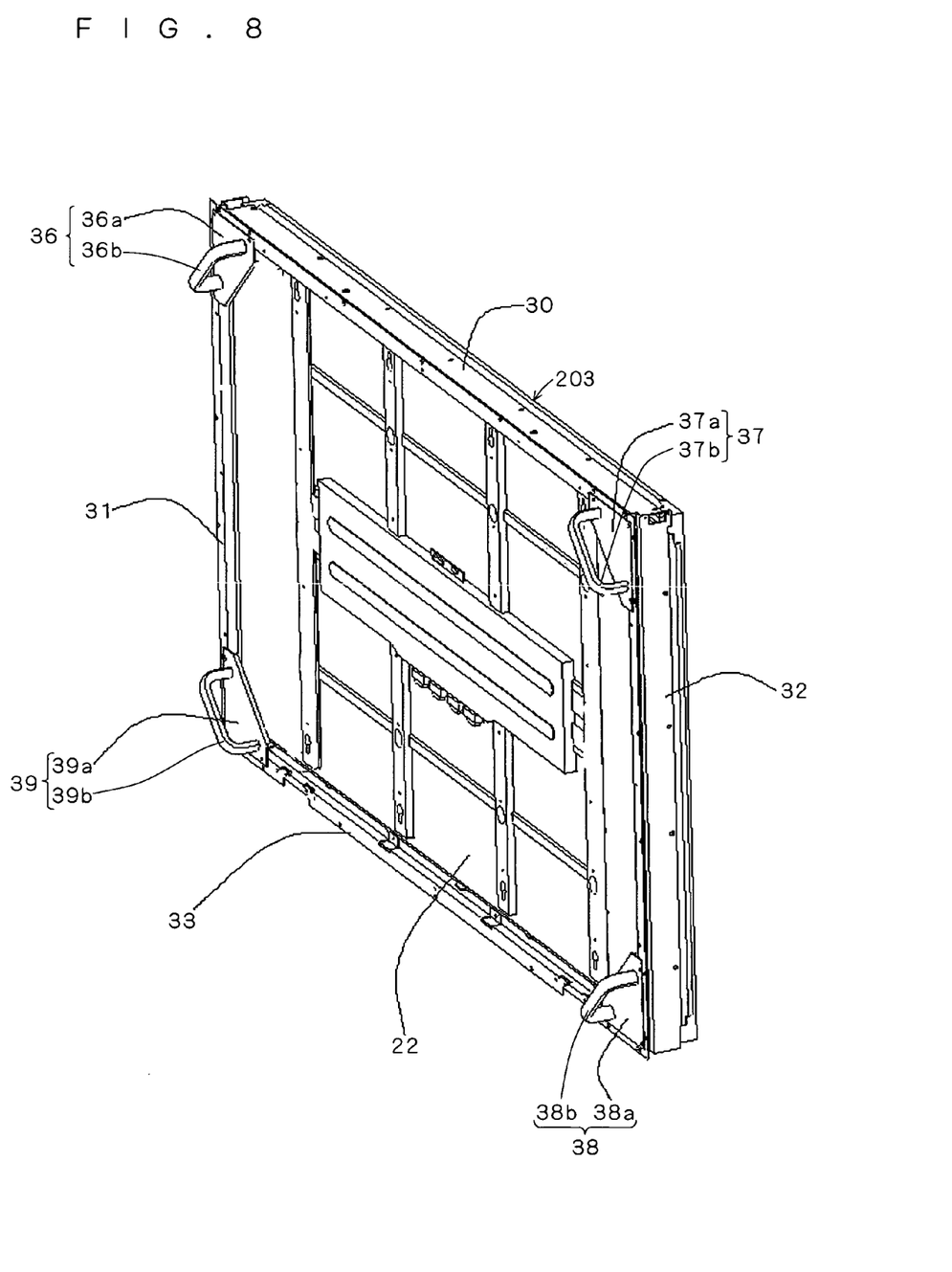
FIG. 8 is a perspective view of a display panel unit.

Now, a display apparatus according to a first preferred embodiment will be described. FIG. 1 is an exploded perspective view of the display apparatus of the first preferred embodiment, FIG. 2 is a perspective view of the display apparatus seen from front, FIG. 3 is a perspective view of the display apparatus seen from behind, FIG. 4 is a perspective view of the display apparatus with back panels detached therefrom, FIG. 5 is a partial perspective view illustrating the internal structure of the display apparatus seen from behind, FIG. 6 is a perspective view of a panel supporting member of the display apparatus seen from front, FIG. 7 is a perspective view of the panel supporting member seen from behind, and FIG. 8 is a perspective view of a display panel unit. In the description below, for the sake of convenience, the upper and lower directions are defined assuming the ordinary use of the display apparatus standing in an approximately upright posture, and the direction in which its display surface faces is referred to as front, the opposite direction as back, and right and left directions are defined in relation to these directions.

The display apparatus 10 has a display panel unit 20, a panel supporting member 40 as a mount member, and a front panel unit 60.

The display panel unit 20 has a panel body 22, peripheral frames 30, 31, 32 and 33, and handles 36, 37, 38 and 39.

The panel body 22 is formed like an approximately rectangular plate, and it has a display surface 22a formed on its one main surface to display an image. The panel body 22 displays an image on the display surface 22a by driving individual picture elements on the basis of an image signal generated in a circuit board 58 described later. The panel body 22 is composed of a flat display panel such as a liquid-crystal display panel, a plasma display panel, or an organic EL display panel, and more particularly it is composed of a large-screen flat display panel.

The peripheral frames 30, 31, 32 and 33 are rod-like members attached to the peripheries of the display panel body 22. In this example, the four peripheral frames 30, 31, 32 and 33 are positioned to surround the four edges of the display panel body 22. More specifically, the peripheral frame 30 is fixed, e.g. by screwing, along the entire upper edge of the panel body 22, the peripheral frames 31 and 32 are fixed, e.g. by screwing, respectively along the entire side edges of the panel body 22, and the peripheral frame 33 is fixed, e.g. by screwing, along the entire lower edge of the panel body 22.

The handles 36, 37, 38 and 39 are attached to the display panel unit 20, or to the back side of the display panel unit 20 in this example, in such a way that they are at least partially exposed outside.

More specifically, a plurality of handles 36, 37, 38 and 39 are attached to the display panel unit 20 in such a way that they each couple and fix at least two of the plurality of peripheral frames 30, 31, 32 and 33. That is, the handles 36, 37, 38 and 39 include strengthening plates 36*a*, 37*a*, 38*a* and 39*a*, and handle bodies 36*b*, 37*b*, 38*b* and 39*b* fixed like projections on one main surfaces of the strengthening plates 36*a*, 37*a*, 38*a* and 39*a*. For example, in the area where the peripheral frames 30 and 31 adjoin each other at their ends, the strengthening plate 36*a* formed in an approximately triangular shape is fixed, e.g. by screwing, to the end portions of the two peripheral frames 30 and 31, thereby coupling and fixing the two peripheral frames 30 and 31. In the same way, the strengthening plate 37*a* couples and fixes the two peripheral frames 30 and 32, the strengthening plate 38*a* couples and fixes the two peripheral frames 32 and 33, and the strengthening plate 39*a* couples and fixes the two peripheral frames 31 and 33. These strengthening plates 36*a*, 37*a*, 38*a* and 39*a* reinforce the torsional rigidity of the display panel unit 20.

The handles 36, 37, 38 and 39 are positioned in the four corners of the display panel unit 20, and they are entirely exposed outside. Also, in the direction approximately perpendicular to the display surface 22*a* of the display panel body 22, the handles 36, 37, 38 and 39 are positioned such that they do not overlap a back support unit 42 and legs 50 of the panel supporting member 40. This will be more fully described later with the panel supporting member 40.

The panel supporting member 40 has the back support unit (also called a chassis) 42 and legs 50, and the display panel unit 20 is attached to the panel supporting member 40 so that the panel supporting member 40 holds the display panel unit 20 in a given position and a given posture.

The back support unit 42 is a member that is attached to the back of the display panel unit 20, and the back support unit 42 of this example has a plurality of (four) back frames 43, 44, 45 and 46 and a coupling and strengthening members 48. The back frames 43, 44, 45 and 46 are elongate members, and they are coupled and fixed by the coupling and strengthening members 48 in such a way that the back frames 43, 44, 45 and 46 stand in an upright posture at intervals in the width direction. The back support unit 42 is thus formed like an approximately rectangular plate on the whole. The back frames 43, 44, 45 and 46 are fixed, e.g. by screwing, to the back of the display panel unit 20, whereby the back support unit 42 is attached and fixed to the back of the display panel unit 20. A circuit board 58 and cooling fans 59 are attached to the back support unit 42.

The width dimension of the back support unit 42 is set smaller than the width dimension of the display panel unit 20 at least by the width dimensions of the handles 36, 37, 38 and 39. Thus, the handles 36, 37, 38 and 39 attached in the four corners of the display panel unit 20 are exposed outside of the panel supporting member 40, and they do not overlap the back support unit 42 and the legs 50 in the direction approximately perpendicular to the display surface 22*a* of the display panel body 22.

Also, the back support unit 42 has abutting portions 43*a* and 46*a* that can be placed in contact with the display panel unit 20 to hold the weight of the display panel unit 20. In this example, the upper ends of the back frames 43 and 46, positioned at both ends in the width direction, serve as the abutting portions 43*a* and 46*a*. At the back of the display panel unit 20, the upper peripheral frame 30 projects and its lower surface abuts on the abutting portions 43*a* and 46*a*, whereby the weight of the display panel unit 20 is supported thereon. The shape, position etc. of the abutting portions 43*a* and 46*a* are not limited to those described above. For example, the abutting portions may be formed as projections in arbitrary positions of the back support unit 42, e.g. in intermediate positions of the back frames 43, 44, 45 and 46, and then recesses or projections formed on the back of the display panel unit 20, for example, can abut thereon so that the weight of the display panel unit 20 is supported.

The legs 50 are constructed to support the back support unit 42 in an upright posture so that it will not collapse. In this example, two legs 50 are fixed to the lower portions of the back frames 43 and 46, e.g. by screwing or by a fit structure. The legs 50 each have an elongate flat portion that extends frontward and backward in an approximately horizontal posture under the back frames 43 and 46, and these portions are placed on the surface of installation and keep the display apparatus 10 in an upright posture.

The front panel unit 60 is formed like an approximately rectangular frame in correspondence with the outer shape of the display panel unit 20, and the front panel unit 60 is fixed, e.g. by screwing, around the display panel unit 20, e.g. to the peripheral frames 30, 31, 32 and 33, to cover the peripheries of the display panel unit 20.

At the back of the panel supporting member 40, back panels 70, 71 and 72 are attached to cover the back surface of the panel supporting member 40. The back panel 70 is a member that covers the approximately center area in the width direction of the back surface of the panel supporting member 40, and the back panels 71 and 72 are members that cover the side areas in the width direction of the back surface of the panel supporting member 40. These back panels 70, 71 and 72 are fixed, e.g. by screwing, to the peripheries of the display panel unit 20, e.g. to the peripheral frames 30, 31, 32 and 33. The back panels 71 and 72 have cuts 71*a* and 72*a* formed in their outer corners that coincide with the handles 36, 37, 38 and 39, and so the handles 36, 37, 38 and 39 are exposed outside even when the back panels 71 and 72 are attached. Alternatively, the back panels 70, 71 and 72 may be formed to cover the handles 36, 37, 38 and 39. However, forming the back panels 70, 71 and 72 to expose the handles 36, 37, 38 and 39 offers convenience because the display apparatus 10 can be moved by holding the handles 36, 37, 38 and 39 even when the display apparatus 10 is completely assembled.

Now, with the display apparatus 10 thus configured, how to replace the display panel body 22 will be described.

For example, when a built-in backlight reaches the end of its life and does not turn on any longer, or when the quality of image on the display panel body 22 has deteriorated for some reason, the existing display panel unit 20 is replaced by a new display panel unit 20.

First, in initial state, the display apparatus 10 stands upright on the legs 50 in the place where it is installed. In this state, the handles 36, 37, 38 and 39 are exposed out of the apparatus, and so two or more people can together carry and move the display apparatus 10 by holding the handles 36, 37, 38 and 39. That is, the handles 36, 37, 38 and 39 are used as handgrips for replacing the display panel body 22 and for carrying and moving the display apparatus 10. In this state, the front panel unit 60 is detached frontward from the display panel unit 20, e.g. by loosening screws fixing the front panel unit 60. Next, the back panels 70, 71 and 72 are detached backward from the display panel unit 20, e.g. by loosening screws fixing the back panels 70, 71 and 72. In this process, the handles 36, 37, 38 and 39 are exposed outside from the cuts 71*a* and 72*a* of the back panels 71 and 72, and therefore the back panels 70, 71 and 72 can be detached without removing etc. the handles 36, 37, 38 and 39.

Next, screws, for example, fixing and coupling the display panel unit 20 and the back support unit 42 are removed. In this process, at the back of the display panel unit 20, the lower surface of the peripheral frame 30 abuts on the abutting portions 43a and 46a, and therefore the display panel unit 20 is prevented from dropping off due to its own weight. Accordingly, there is no need for an assisting worker to prevent the display panel unit 20 from dropping off, falling down, etc. during the process of removing screws etc. that fix the display panel unit 20 to the back support unit 42.

Next, the display panel unit 20 is detached frontward from the back support unit 42. In this process, even when the display panel unit 20 is so large that one person cannot reach both sides of the display panel unit 20 even with both hands stretched at full length, or even when the display panel unit 20 is so heavy that one person cannot carry it, two or more people can work together to detach and carry the display panel unit 20 by holding the plurality of handles 36, 37, 38 and 39.

Then, after the display panel unit 20 has been detached from the panel supporting member 40 and moved to another place, the peripheral frames 30, 31, 32 and 33 are detached from the display panel body 22, e.g. by removing screws that fix the peripheral frames 30, 31, 32 and 33 around the display panel body 22. In this process, the peripheral frames 30, 31, 32 and 33 are still coupled and fixed together by the handles 36, 37, 38 and 39 like a frame of an approximately rectangular shape. After that, the peripheral frames 30, 31, 32 and 33, coupled and fixed like an approximately rectangular-shaped frame, are fitted around a new display panel body 22 from behind, and fixed with screws, for example.

Next, the display panel unit 20, incorporating the new display panel body 22, is lifted up by holding the handles 36, 37, 38 and 39, and the display panel unit 20 is set in place such that the back side of the display panel unit 20 faces the front side of the panel supporting member 40 that is standing upright, and such that the lower surface of the peripheral frame 30 abuts on the abutting portions 43a and 46a. The display panel unit 20 is then fixed, by screwing, to the back support unit 42. In this process, at the back of the display panel unit 20, the lower surface of the peripheral frame 30 abuts on the abutting portions 43a and 46a, and therefore no assisting worker is needed to prevent the display panel unit 20 from dropping off or falling down. Accordingly, when there are a plurality of workers, all workers can join the work of screwing, or the work of screwing and the work of packaging the detached display panel body 22 can be conducted at the same time, for example. This shortens the time required for the replacement of the display panel body 22.

Also, when a large space cannot be used for the replacement work, another set of peripheral frames 30, 31, 32 and 33 may be previously attached to the new display panel body 22, and it can be used as a maintenance part. That is, with the old display panel unit 20 detached from the panel supporting member 40, the handles 36, 37, 38 and 39 are detached therefrom. Then, the handles 36, 37, 38 and 39 are attached, e.g. by screwing, to the peripheral frames 30, 31, 32 and 33 of the new display panel unit 20 prepared as a maintenance part, with the new display panel unit 20 standing upright. Then, as in the process described earlier, the display panel unit 20 incorporating the new display panel body 22 is attached to the panel supporting member 40. This eliminates the need for the work of detaching and attaching the peripheral frames 30, 31, 32 and 33 from and to the peripheries of the display panel units 20, and makes it possible to replace the display panel body 22 even in a relatively small work space.

Then, after attaching the display panel unit 20 having the new display panel body 22 to the panel supporting member 40, the front panel unit 60 is attached from the front side to the peripheral frames 30, 31, 32 and 33, e.g. by screwing, and the back panels 70, 71 and 72 are fit to the peripheral frames 30, 31, 32 and 33 from the back side and fixed thereto, e.g. by screwing. The replacement work is thus finished, and problems like failed backlight or deteriorated image display quality are solved.

According to the display apparatus 10 thus constructed, the display panel unit 20 has the handles 36, 37, 38 and 39, and the handles 36, 37, 38 and 39 are exposed outside of the panel supporting member 40. Therefore, the worker(s) can hold the display panel unit 20 by holding the handles 36, 37, 38 and 39, which facilitates the work of replacing the display panel unit 20. In particular, this contributes to the improvement of workability of the replacement of the display panel unit 20 when it has a large screen of 40-inch or more, for example. It is not essential that the handles 36, 37, 38 and 39 be entirely exposed outside of the panel supporting member 40, but the handles 36, 37, 38 and 39 can be formed such that they are at least partially exposed outside of the panel supporting member 40.

Also, the presence of the plurality of handles 36, 37, 38 and 39 makes the replacement work easy even when the display panel unit 20 is very heavy, because a plurality of workers can conduct the work by holding the plurality of handles 36, 37, 38 and 39.

Furthermore, each of the handles 36, 37, 38 and 39 is attached in such a way that it couples and fixes at least two of the plurality of peripheral frames 30, 31, 32 and 33. This enhances the torsional rigidity of the display panel unit 20, and effectively prevents deformation, breakage of glass, etc. of the display panel unit 20 when it is supported or carried with the handles 36, 37, 38 and 39 grasped.

Also, the back support unit 42 has the abutting portions 43a and 46a to support the weight of the display panel unit 20, and therefore it is not necessary for a worker to hold the whole weight of the display panel unit 20, e.g. during the work of removing screws that fix the display panel unit 20 to the back support unit 42. This further facilitates the work of replacing the display panel unit 20.

Furthermore, the handles 36, 37, 38 and 39 are located in such a way that they do not overlap the back support unit 42 and the legs 50 in the direction approximately perpendicular to the display surface 22a of the display panel body 22. Accordingly, by moving the display panel unit 20 in the direction approximately perpendicular to the display surface 22a (frontward, in this example) by holding the handles 36, 37, 38 and 39, it is possible to detach/attach the display panel unit 20 from/to the panel supporting member 40 without lifting up the display panel unit 20 far upward, for example. This further facilitates the work of detaching/attaching the display panel unit 20.

Second Preferred Embodiment

Figure 9:
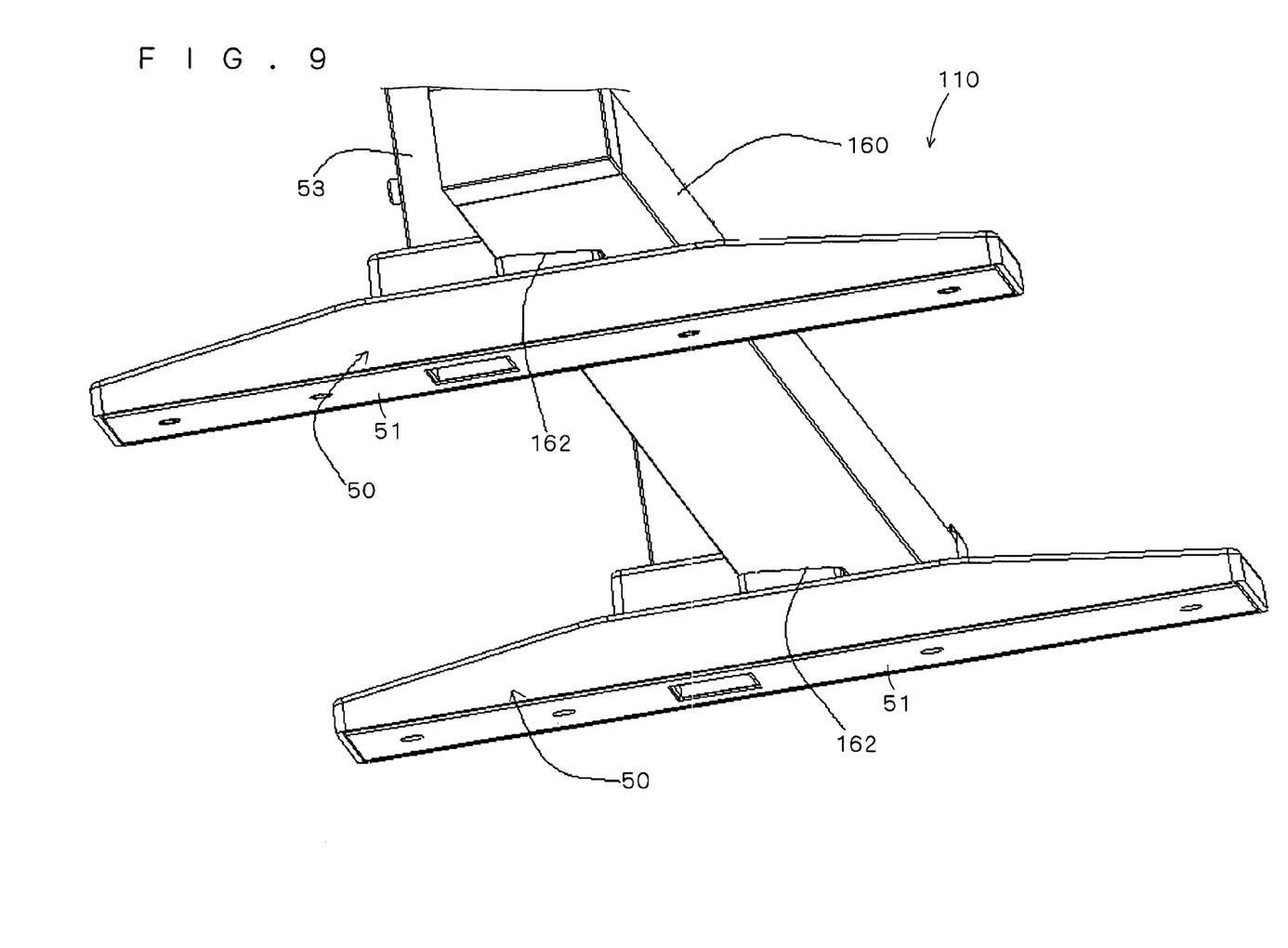
FIG. 9 is a perspective view showing an essential portion of a front panel and legs of a display apparatus according to a second preferred embodiment.
Figure 10:
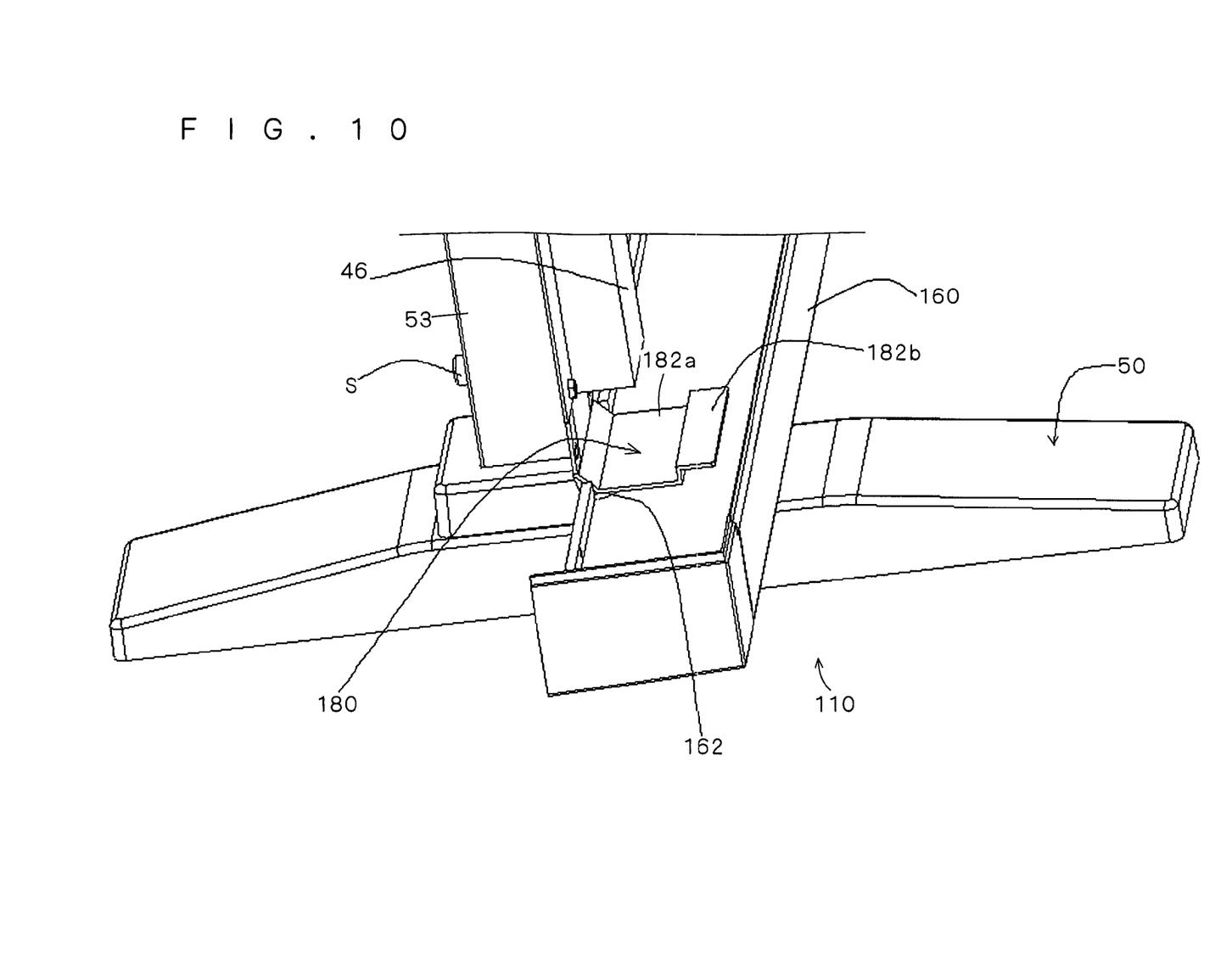
FIG. 10 is a perspective view showing an essential portion of the front panel and legs of the display apparatus.
Figure 11:
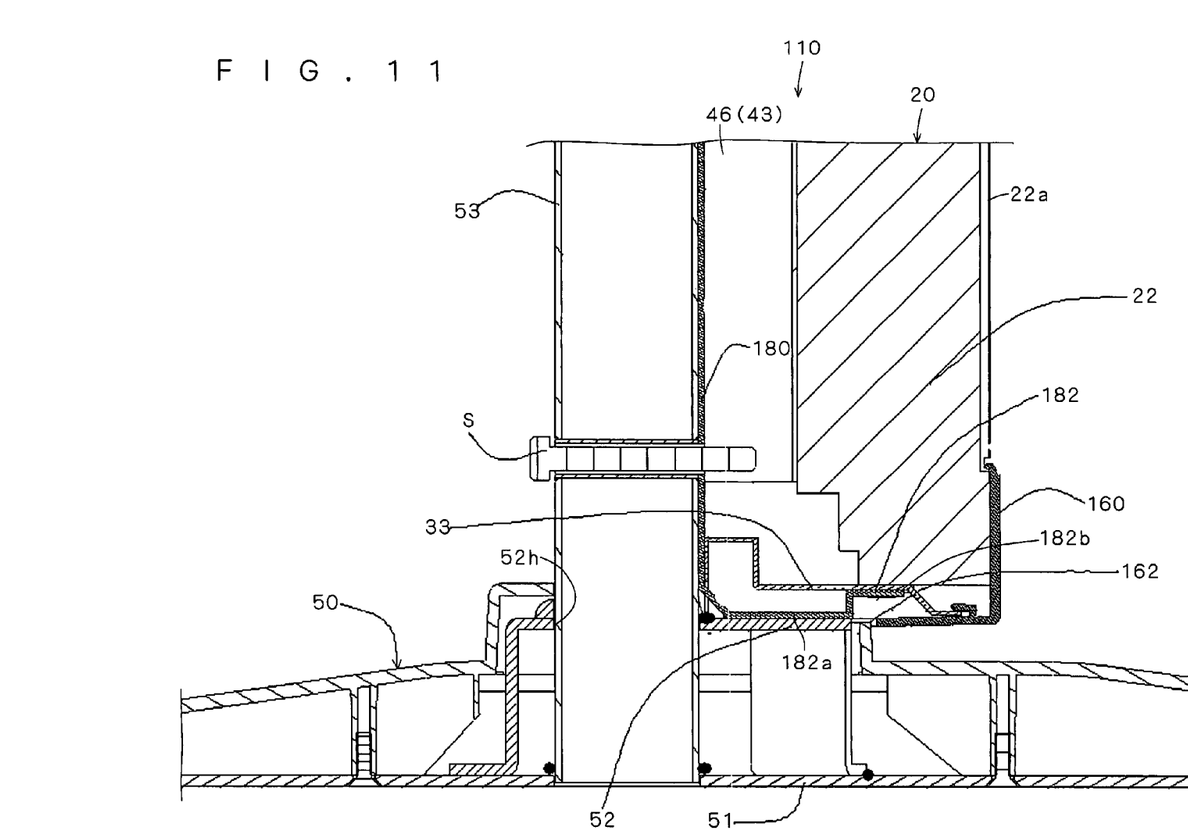
FIG. 11 is a cross-sectional view of an essential portion of the display apparatus.

Now, a display apparatus according to a second preferred embodiment will be described. In the description of this preferred embodiment, the same components as those described in the first preferred embodiment are indicated with the same reference characters and not described again here. FIGS. 9 and 10 are perspective views illustrating an essential part of the front panel and legs of the display apparatus of the second preferred embodiment, and FIG. 11 is a cross-sectional view illustrating the essential part of this preferred embodiment which corresponds to the section taken along line XI-XI in FIG. 4.

In this display apparatus 110, a panel supporting member 40, as the mount member described above, has bottom abutting portions 182. Each bottom abutting portion 182 is placed in contact with the up-facing surface of the leg 50, and they can be placed in contact with the bottom surface of the display panel unit 20 to hold the weight of the display panel unit 20.

More specifically, each leg 50 has a bottom plate 51 to be placed in contact with the ground, a stand 52 fixed to the bottom plate 51, and a prop 53 fixed to the stand 52. The stand 52 is fixed to the bottom plate 51, e.g. by welding, and it has a hole 52h into which the lower end of the prop 53 can be inserted. The lower end of the prop 53 is inserted into the hole 52h and fixed to the stand 52 and bottom plate 51, e.g. by welding. The back frames 43 and 46 are attached and fixed to the props 53 such that the back frames 43 and 46 are held in an approximately upright posture with respect to the legs 50.

Also, one end of an approximately L-shaped fixing member 180 is fixed, e.g. by screwing, to the lower end of the back frame 43 or 46. Also, the one end of the approximately L-shaped fixing member 180 is fixed to the prop 53, while the other end of the fixing member 180 is positioned on the upper surface of the stand 52. In this example, the approximately L-shaped fixing member 180 is fixed by a screw S inserted from behind the prop 53. That other end of the fixing member 180 serves as the bottom abutting portion 182. That is, that other end of the fixing member 180 is once bent upward and then bent again frontward, and its rear portion 182a on the rear side of the bend is in contact with the upper surface of the stand 52, i.e. with the up-facing surface of the leg 50, and its front portion 182b on the front side of the bend is in contact with the bottom surface of the display panel unit 20. In this example, the bottom abutting portions 182 are formed such that they can be placed in contact with the peripheral frame 33 of the display panel unit 20.

Thus, the display panel unit 20 is attached such that the peripheral frame 33 at the bottom of the display panel unit 20 abuts on the bottom abutting portions 182, and then the weight of the display panel unit 20 is supported by the bottom abutting portions 182 placed in contact with the upper surfaces of the legs 50. Accordingly, the screws S are less likely to suffer from shearing load in the direction in which the weight of the display panel unit 20 works. Also, when the display apparatus 110 is pushed frontward or backward and a load is applied in a direction to cause it to fall down, a tensile stress works in the axial direction of the screws S. However, the mating friction of the screws S prevents the screws S from coming off, and the legs 50 and the back support unit 42 are kept coupled in the manner described above, and so the back support unit 42 and the display panel unit 20 will not collapse. Also, the weight of the display panel unit 20 applies a bending moment to the welded portions between the props 53 and the bottom plates 51, but this bending stress is reduced because the fixing members 180 having the bottom abutting portions 182 are in close contact with the upper surfaces of the stands 52. In this example, each prop 53 is fixed by welding also with the stand 52, and therefore the bending stress applied to the welded portion between the bottom plate 51 and the prop 53 is alleviated. Accordingly, high bending rigidity is obtained at the connections with the props 53 even when the bottom plates 51 are relatively thin, which facilitates weight reduction or cost reduction of the legs 50.

Also, the front panel unit 160, corresponding to the front panel unit 60 described earlier, has cuts 162 formed in positions corresponding to the bottom abutting portions 182, so that the bottom abutting portions 182 are accommodated in the cuts 162 when the front panel unit 160 is attached. The front panel unit 160 can be formed to at least cover the bottom of the display panel unit 20.

For the replacement of the display panel body 22 of the display apparatus 110 of the second preferred embodiment, as in the first preferred embodiment, screws are removed to detach the old display panel unit 20 from the back support unit 42, and then screws are tightened to fix a new display panel unit 20 to the back support unit 42, while keeping the display apparatus 110 standing upright without removing the legs 50 etc. In both steps, the display panel unit 20 abuts on, and is supported by, the bottom abutting portions 182, and so the display panel unit 20 will not drop off because of its own weight. This eliminates the need for an assisting worker to support the display panel unit 20. When the front panel unit 160 is removed and replaced by another front panel unit 160 of a different color or design, for example, the front panel unit 160 can be removed while keeping the display apparatus 110 standing upright, without the need to remove the legs 50. Also, the new front panel unit 160 of a different color or design, and having the cuts 162 formed as described above, can be attached while keeping the display apparatus 110 standing upright. Accordingly, the front panel unit 160 is less likely to be damaged during the replacement work of the front panel unit 160. Also, the cuts 162 prevent interference between the legs 50 and the front panel unit 160 even when the legs 50 and the front panel unit 160 are placed very close to each other. Accordingly, the bottom surface of the front panel unit 160 can be placed in a lower position adjoining the legs 50, and so the center of gravity of the display apparatus 110 can be set lower. This prevents the display apparatus 110 from falling down even when it is tilted at larger angles. Also, when the display apparatus 110 is hung on the wall with the legs 50 detached from it, the fixing members 180 close the cuts 162 so that the design or appearance of the display apparatus 110, without the legs 50, is not considerably damaged when seen from below.

According to the display apparatus 110 of this preferred embodiment, the display panel unit 20 is placed to abut on the bottom abutting portions 182, and so the weight of the display panel unit 20 is supported on them. This eliminates the need for a worker to support the whole weight of the display panel unit 20. This further facilitates the work of replacing the display panel body 22. Particularly, because the bottom abutting portions 182 are placed in contact with the up-facing surfaces of the legs 50, the display panel body 22 can be stably supported not only during the replacement work but also in ordinary use.

Also, the front panel unit 160 is provided to cover the bottom of the display panel unit 20 above the legs 50, and the front panel unit 160 has the cuts 162 formed in positions corresponding to the bottom abutting portions 182, which allows the front panel unit 160 to be replaced without removal of the legs 50.

Modifications

In the preferred embodiments, the handles 36, 37, 38 and 39 have the strengthening plates 36a, 37a, 38a and 39a and the handle bodies 36b, 37b, 38b and 39b, but their structure is not limited to this example. For example, both ends of the handle bodies 36b, 37b, 38b and 39b may be coupled and fixed directly to two of the peripheral frames 30, 31, 32 and 33.

Also, the legs 50 of the preferred embodiments are provided as a pair of separate right and left legs, but a single leg may be positioned in the center to support the display apparatus 10 or 110 in an upright posture.

The preferred embodiments are applicable to various kinds of flat-type display apparatuses, such as liquid-crystal displays, plasma displays, organic EL displays, etc., and are particularly suitable when the display apparatus has a screen that is so large that one person cannot reach both sides of the display panel unit even with both hands stretched at full length, or when the display apparatus has a display panel unit that is so heavy that one person cannot carry it.

While the invention has been described in detail, the foregoing description is in all aspects illustrative and not restrictive. It is understood that numerous other modifications and variations can be devised without departing from the scope of the invention.

What is claimed is:

1. A display apparatus comprising:
   a display panel unit including a display panel body that displays an image;
   a mount member that is attached to said display panel unit and supports said display panel unit; and
   an external casing, enclosing said display panel unit when said display apparatus is in an operable state, including one or more back panels,
   wherein said display panel unit is detachable from said mount member, said display panel unit includes a handle, and the handle is at least partially exposed outside of said mount member,
   wherein said mount member is attached to said display panel unit when said display apparatus is in the operable state,
   wherein said handle is exposed by said one or more back panels outside said display apparatus in such manner as to be usable as a handgrip for lifting said display apparatus when said display apparatus is in the operable state,
   wherein said display panel unit is detachable from said mount member in such manner that the mount member no longer supports said display panel unit,
   wherein said mount member is a panel supporting member comprising: a back support unit attached to a back side of said display panel unit; and a leg that supports said back support unit in an upright posture,
   said back support unit has an abutting portion that can abut on said display panel unit to support a weight of said display panel unit,
   said display panel unit includes peripheral frames attached to the peripheries of the display panel body, and
   said abutting portion abuts on said peripheral frames.

2. The display apparatus according to claim 1, wherein said handle includes a plurality of handles.

3. The display apparatus according to claim 1,
   wherein said display panel unit includes a plurality of peripheral frames attached around said display panel body, and
   wherein said handle is attached to said display panel unit in such a way that said handle couples and fixes at least two of said plurality of peripheral frames.

4. The display apparatus according to claim 1,
   wherein said mount member is a panel supporting member comprising: a back support unit attached to a back side of said display panel unit; and a leg that supports said back support unit in an upright posture, and
   said handle is located in a position that does not overlap said back support unit and said leg in a direction approximately perpendicular to a display surface of said display panel body.

5. The display apparatus according to claim 1, wherein said handle is one of a plurality of handles, which are exposed by said one or more back panels outside said display apparatus in such manner as to be usable as handgrips for lifting said display apparatus.

6. A display apparatus comprising:
   a display panel unit including a display panel body that displays an image; and
   a mount member that is attached to said display panel unit and supports said display panel unit,
   wherein said display panel unit is detachable from said mount member, said display panel unit includes a handle, and the handle is at least partially exposed outside of said mount member,
   wherein said mount member is a panel supporting member comprising: a back support unit attached to a back side of said display panel unit; a leg that supports said back support unit in an upright posture; and a bottom abutting portion that is provided in contact with an up-facing surface of said leg and that abuts on a bottom of said display panel unit to support a weight of said display panel unit,
   wherein a front panel unit is provided to at least cover the bottom of said display panel unit in a position higher than said leg, and
   said front panel unit has a cut formed in a position corresponding to said bottom abutting portion.

7. A display apparatus comprising:
   a display panel unit including a display panel body that displays an image; and
   a mount member that is attached to said display panel unit and supports said display panel unit,
   wherein said display panel unit is detachable from said mount member, said display panel unit includes a handle, and the handle is at least partially exposed outside of said mount member,
   wherein said mount member is attached to said display panel unit when said display apparatus is in an operable state,
   wherein said handle is exposed outside said display apparatus when said display apparatus is in the operable state, and
   wherein said display panel unit is detachable from said mount member in such manner that the mount member no longer supports said display panel unit,
   wherein said mount member includes a panel supporting member comprising:
   a back support unit detachably attached to a back side of said display panel unit; and
   a leg that supports said back support unit in an upright position.

\* \* \* \* \*